United States Patent [19]
Yoo et al.

[11] Patent Number: 5,461,093
[45] Date of Patent: Oct. 24, 1995

[54] BIODEGRADABLE POLYETHYLENE COMPOSITION CHEMICALLY BONDED WITH STARCH AND A PROCESS FOR PREPARING THEREOF

[75] Inventors: Yong-deuk Yoo, Seoul; Yong-wook Kim, Bucheon; Won-yung Cho, Incheon, all of Rep. of Korea

[73] Assignee: Yukong Limited, Seoul, Rep. of Korea

[21] Appl. No.: 156,369

[22] Filed: Nov. 23, 1993

[30] Foreign Application Priority Data

Nov. 24, 1992 [KR] Rep. of Korea ............... 92-22255
Jul. 23, 1993 [KR] Rep. of Korea ............... 93-14072

[51] Int. Cl.$^6$ ............... C08L 3/06; C08L 3/08; C08L 3/00; C08K 5/09
[52] U.S. Cl. ............... 524/47; 524/50; 524/51; 524/52; 524/322; 524/394; 524/398; 523/126; 523/128; 525/54.26
[58] Field of Search ............... 523/128, 126; 524/47, 50, 51, 52, 394, 322, 398, 112; 526/238.22; 525/54.26

[56] References Cited

U.S. PATENT DOCUMENTS

| | | | |
|---|---|---|---|
| 4,931,488 | 6/1990 | Chiquet | 524/52 |
| 5,162,392 | 11/1992 | Woo et al. | 524/47 |
| 5,262,458 | 11/1993 | Bastioli et al. | 523/128 |

FOREIGN PATENT DOCUMENTS

| | | | |
|---|---|---|---|
| 232311 | 1/1959 | Australia | 524/54.26 |

*Primary Examiner*—Paul R. Michl
*Assistant Examiner*—LaVonda R. DeWitt
*Attorney, Agent, or Firm*—Abelman, Frayne & Schwab

[57] ABSTRACT

In the present invention, the lowering of physical properties is minimized by bonding matrix resin and starch chemically using a coupling agent in the presence of an organic acid catalyst, at the same time lowering of the production cost is achieved by simplyfing the process. In the prior arts, the problems associated with low physical properties caused by starch incorporation were approached only in terms of enhanced physical interacting strength between matrix resin and starch.

The purposes of the present invention are to provide a biodegradable polyethylene composition chemically bonded with starch comprising 100 parts by weight of matrix resin, 5–400 parts by weight of biodegradable incorporating material, 0.01–10 parts by weight of coupling agent, 0.01–1.0 parts by weight of radical initiator, 0.01–5 parts by weight of Lewis acid catalyst, 0.01–10 parts by weight of autoxidizing agent and 0.01–10 parts by weight of plasticizer and to provide a process for preparing thereof.

The biodegradability of the polyethylene composition prepared by the present invention was determined in addition with reclamation test and shown to be excellent at a content of more than 10 wt. % of starch.

15 Claims, 2 Drawing Sheets

BIODEGRADABLE POLYETHYLENE COMPOSITION CHEMICALLY BONDED WITH STARCH AND A PROCESS FOR PREPARING THEREOF

CROSS REFERENCE TO RELATED APPLICATIONS

Application Ser. No. 08/156,371 is a related application.

1. Field of the Invention

This invention relates to a biodegradable polyethylene composition by chemically bonding starch to polyethylene chain using polyethylene which is a polyolefin having the widest application, various organic acids and a coupling agent, for example maleic anhydride, methacrylic anhydride or maleimide, and to a process for preparing thereof.

2. Description of the Prior Art

Plastic has been produced in a large amount as a substitutive material for metal due to its low price and light character as well as excellent physical properties such that it has established as a necessary material in everyday life. However, each country of the world is preparing for diversified countermeasures as polution problems from numerous plastic products are globally getting serious and it becomes to be an interesting matter to solve such polution problems arising from useless plastic wastes in Korea.

Methods for solving these problems include recycling, incineration and landfill but each method has a limit (limit of recycled products on use, excess cost and deficiency of space for landfill) and many studies on degradable plastic have been made recently in each country of the world.

The technology on degradable plastic can be divided into photodegradable field, biodegradable field and biophotodegradable field, and products related to biophotodegradable field have been increased as substituents for general plastic products recently. The technology on photodegradable field is divided into two types, introduction of photosensitive functional groups and adding of photosensitive reagents and the former type is commercially available by Dow Chemical Co., Du Pont Co., Union Carbide Co. and Bayer Co., using copolymer of ethylene and carbon monoxide commercially, as well as Ecoplastic Co., using vinyl ketone copolymer commercially. The latter type is commercially available by Ampacet Co. and Ideamasters Co., the type of adding metal complex developed by Scott-Gilead Co. being a main type. There, however, remain high cost problems when these photodegradable products are used as general films and photodegradable products are not degraded in case that the sun light is intercepted, while they are buried under the soil. Accordingly, the technology of photodegradative field cannot solve these general problems about plastic wastes so that alternative studies on the technology of biodegradable field have been carried out in various countries.

While there are many kinds of biodegradable plastic, for example microorganism producing polymers like PHB-(poly-β-hydroxybutylate), polymers using microorganism producing biochemical, or polymers having natural polymer chitin or starch, the problems which are concerned with the present technology about polymers having starch will be mentioned and improvements be described in this specification. U.S. Pat. No. 4,021,388 by G. J. L. Griffin discloses a process for preparing biodegradable film improved by treating the surface of starch with silane coupling agent to provide hydrophobic property, but it only increases physical interacting strength a little between matrix resin and starch so that it has difficulty to solve the decrease of physical properties of films upon incorporating starch.

While U.S. Pat. Nos. 4,133,784 and 4,337,181 filed by F. H. Otey et. al. of USDA disclose processes for preparing biodegradable films by adding α-starch to ethylene-acrylic copolymer, it has difficulty to commercialize due to the high price of ethylene-acrylic copolymer and degradation of physical properties of the produced films.

Korean Patent Publication Nos. 90-6336 and 91-8553 filed by Seonil Glucose Co. of Korea disclose processes for increasing physical interacting strength between matrix resin and starch by increasing hydrophobic property of starch or increasing hydrophilic property of matrix resin to increase compatibility with matrix resin and starch.

In the present invention, production cost is diminished by simplifying the process, while adverse effects on physical properties are minimized by bonding matrix resin and starch chemically using a coupling agent. An object of this invention is to provide a biodegradable polyethylene composition chemically bonded with starch and another object of this invention is to provide a process for preparing the biodegradable polyethylene composition.

SUMMARY OF THE INVENTION

The composition of the present invention comprises 100 parts by weight of matrix resin, 5–400 parts by weight of biodegradable incorporating matrial, 0.01–10 parts by weight of coupling agent, 0.01–1.0 parts by weight of radical initiator, 0.01–5 parts by weight: of Lewis acid catalyst, 0.01–10 parts by weight of autoxidizing agent and 0.01–10 parts by weight of plasticizer and optionally 0.01–10 parts by weight of comonomer.

Figure 1:
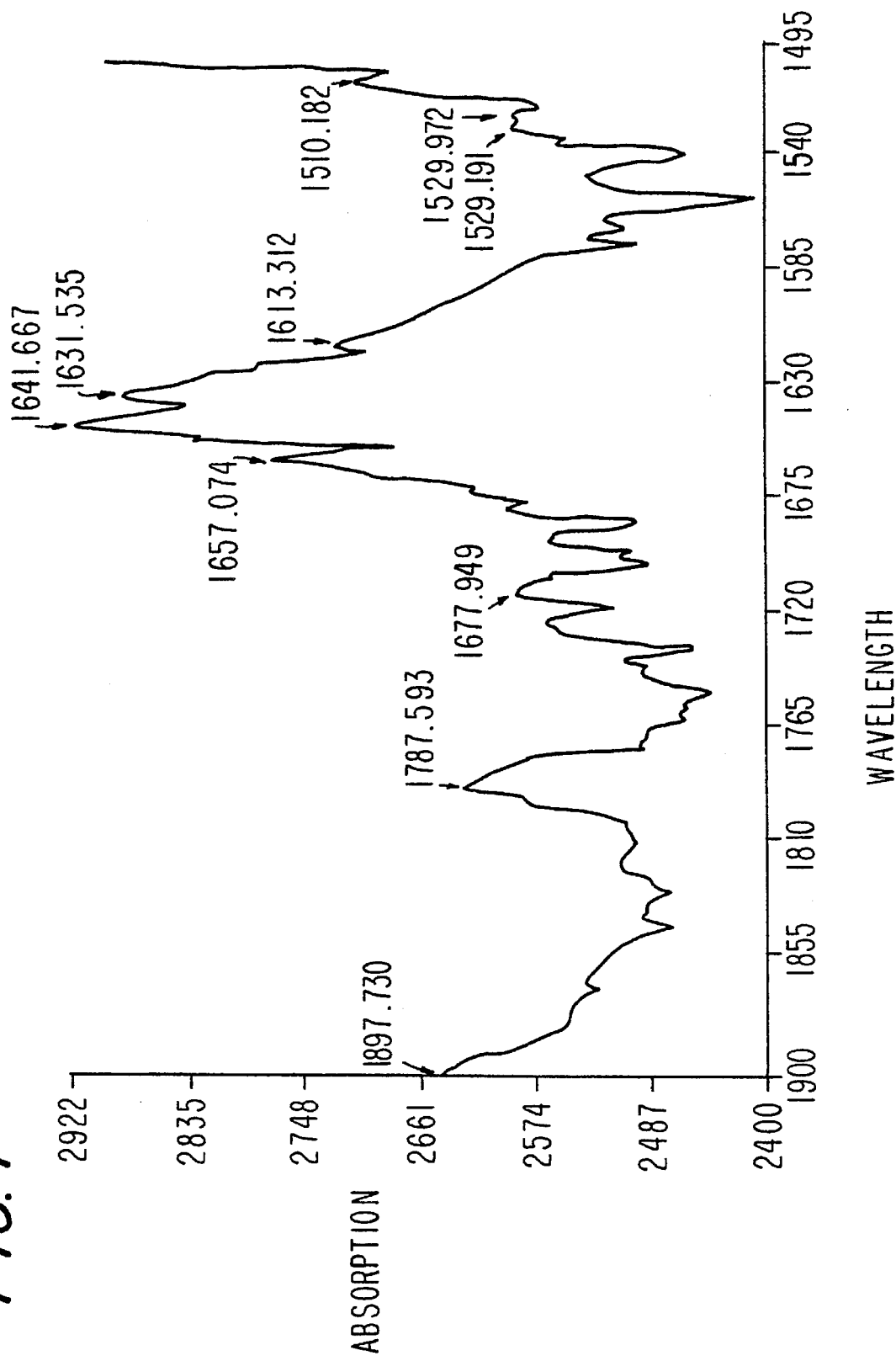
FIG. 1 is infrared absorption spectrum of a biodegradable film in accordance with example 1 of the present invention.

DESCRIPTION OF PREFERRED EMBODIMENTS matrix resin is low density polyethylene(LDPE), linear low density polyethylene(LLDPE) or high density polyethylene(HDPE)and the biodegradable incorporating material is one selected from the group of starch, acid treated starch(thinboiled starch), esterified starch, etherified starch, cationic starch and mixture thereof, for example corn starch, starch acetate and starch phosphate. The coupling agent which chemically bonds the starch and the matrix resin is maleic anhydride, methacrylic anhydride or maleimide, and the radical initiator is benzoyl peroxide, di-tert-butyl peroxide, azobisisobutyronitrile, tert-butyl hydroperoxide, dicumyl peroxide, Lupersol 101 2,5-2,5-di (t-butyl peroxy) hexane(Pennwalt Co.) or Perkadox-14 1,3-bis-(t-butyl peroxyisopropyl benzene)(Akzo Co.) The autoxidizing agent is one or more selected from the group of manganese oleate, manganese stearate, ferrous oleate(II), ferrous stearate(II) and mixture thereof, and the plasticizer is, for example, oleamide, Viton poly(hexaflouropropylene)-copoly(vinylidene fluoride) or Erucamide Cis-13-1-docosenoamide. The comonomer is one or more selected from the group of acrylonitrile, styrene and ethyl acrylate. The Lewis acid catalyst is one or more selected from the group of oleic acid, olenic acid, linoleic acid, stearic acid, acetic acid, p-toluene sulfonic acid, decanoic acid, dodecanoic acid, tetradecanoic acid, oxalic acid, malonic acid, succinic acid and adipic acid.

The process for preparing a biodegaradable polyethylene composition chemically bonded with starch to achieve another object of the present invention comprises mixing matrix resin, biodegradable incorporating material, coupling agent, autoxidizing agent, plasticizer, Lewis acid catalyst and radical initiator in a certain amount and reactive-extruding the mixture.

The reactive-extruding method using a twin screw extruder was applied to lower the production cost through simplifying the process and minimizing the lowering of physical properties after mixing the starch. That is, polyethylene, radical initiator, coupling agent, for example maleic anhydride, methacrylic anhydride or maleimide, corn starch or starch derivatives and coupling catalyst are introduced concurrently and reactive-extruded at a temperature of 150°–220° C. with a screw speed of 50–300 rpm to esterify the starch, during which time grafting of the coupling agent to polyethylene chains occurs. The physical properties are found to be excellent with the use of a coupling agent like maleic anhydride, methacrylic anhydride or maleimide at an amount of 0.01–10 parts by weight, radical initiator at an amount of 0.01–1.0 parts by weight, and Lewis acid catalyst at an amount of 0.01–5 parts by weight and most preferably with radical initiator and Lewis acid catalyst at an amount of 0.3 parts by weight each.

The biodegradable incorporating material is, for example corn starch, modified starch like starch acetate, starch phosphate, oxidized starch, cationic starch and so on, the starch being dried in advance at a moisture content in the range of less than 3% to avoid generation of bubbles on formation of film, as starch on industrial production includes at a moisture content in the range of 12–15%.

The biodegradable resin pellets can be prepared by mixing matrix resin, biodegradable incorporating material, coupling agent, autoxidizing agent, plasticizer, Lewis acid catalyst and radical initiator in a certain amount, melting the mixture in a mixer of a plasticorder or placing each component using a compounder, melting the mixture, extruding the mixture, pelletizing it using a pelletizer. The biodegradable films are prepared by making the pellets into compression molding films or blown films using a hot press and an extruder for film preparation. The compression molding films or blown films can be also prepared by adding low density polyethylene, linear low density polyethylene or high density polyethylene into the pellet, then dry-blending and extruding the mixed pellet. The biodegradable resin pellets also can be molded into polyethylene bottles.

The mechanical properties such as tensile strength and tensile elongation of the biodegradable films were determined by Instron and the physical properties were determined through standard instruments of ASTM. The surface and cross section were also investigated by scanning electron microscope. The biodegradability was investigated by shape deformation and by time dependent changes in physical properties after the films were buried under soil as well as by using ASTM G 21–70 method.

The following examples illustrate the present invention further but do not, limit the scope of the present invention.

EXAMPLE 1

The biogradable films were prepared in this example by chemically bonding starch and polyethylene chains using maleic anhydride as a coupling agent.

50 g of maleic anhydride, 5 g of oleic acid, 5 g of benzoyl peroxide, 50 g of oleamide, 20 g of manganese oleate and 20 g of ferrous oleate were dissolved in 50 ml of acetone, respectively. 5 kg of low density polyethylene(MI=3, density=0.919) was put into Henschel mixer and then coated with the above solution.

The coated polyethylene pellet was reactive-extruded with 60 weight % of corn starch based on the above low density polyethylene in an extruder maintained at 170° C. with a screw speed of 250 rpm to prepare biodegradable master batch pellet in which the starch is chemically bonded with the polyethylene chains. 1.7 kg of biodegradable master batch and 8.3 kg of low density polyethylene(MI=3, density=0.919) were dry-blended to prepare blown films by passing them through a film extruding machine.

To determine the physical properties of the prepared films, the tensile strength and tensile elongation were measured by Instron and the biodegradability was estimated in accordance with ASTM G 21-70 method.

Figure 2:
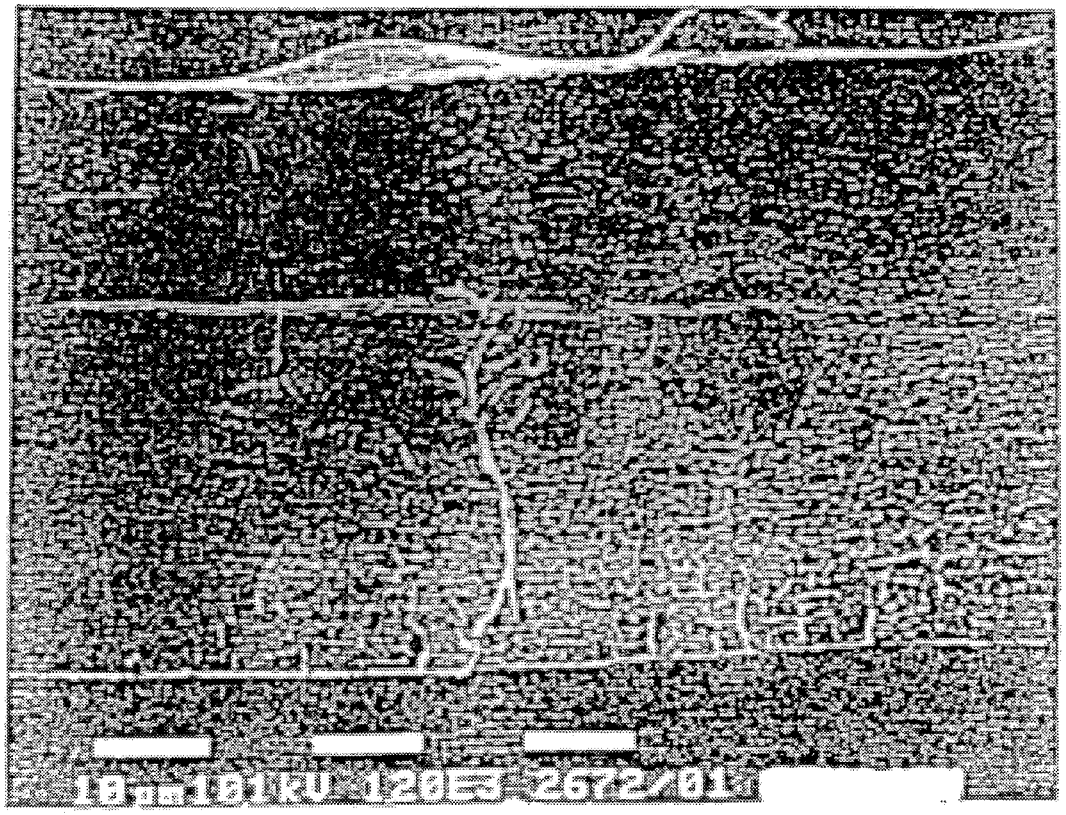
FIG. 2 is an electron micrograph showing a section of a biodegradable film in accordance with example 1 of the present invention by scanning electron microscope(×1,200).

The absorbing peak of carboxylic group generated by reaction of maleic anhydride and hydroxyl group on starch is shown at 1700–1800 $cm^{-1}$ on infrared absorption spectrum of the biodegradable films in FIG. 1, and the picture in FIG. 2 showing cross-section of the biodegradable films by scanning electron microscope shows that the cross-section of starch particle is split confirming that polyethylene chains react with starch chemically by the effect of maleic anhydrid coupling agent.

The physical properties and biodegradability of the biodegradable films prepared by dry-blending the above biodegradable master batch and low density polyethylene(MI= 3, density=0.919) were reported in the following table 1.

The biodegradability was determined in accordance with ASTM G 21-70 method.

After a certain waiting period (at least for 21 days), growth rates were classified according to the fraction of the polymer surface covered with fungal colonies:

| 0%: | 0 |
| less than 10%: | 1 |
| 10–30%: | 2 |
| 30–60%: | 3 |
| 60–100%: | 4 |

EXAMPLES 2–6

The same procedure as example 1 was repeated except that the following wt. % of starch was used based on polyethylene and the results determined with the same method as example 1 were reported in the following table 1.

TABLE 1

| Ex. No. | Content of Starch (wt. %) | Tensile Strength (kg/cm$^2$) | Tensile Elongation (%) | Biodegradability |
|---|---|---|---|---|
| Com. 1* | 0 | 180 | 400 | 0 |
| 1 | 10 | 169 | 346 | 3 |
| 2 | 20 | 153 | 315 | 4 |
| 3 | 30 | 127 | 230 | 4 |
| 4 | 40 | 102 | 155 | 4 |
| 5 | 50 | 65 | 80 | 4 |
| 6 | 60 | 43 | 50 | 4 |

*Comparative Example 1: It was estimated with the same procedure as example 1 except that starch was not incorporated.

EXAMPLE 7

The biodegradable films were prepared in this example using styrene as a comonomer of a coupling agent to enhance grafting efficiency of maleic anhydride, the coupling agent.

35 g of maleic anhydride, 35 g of styrene, 5 g of stearic acid, 20 g of ferrous stearate, 20 g of manganese stearate, 50 g of oleamide and 5 g of benzoyl peroxide were dissolved in 50 ml of acetone, respectively. 5 kg of linear low density polyethylene(MI=1, density=0.919) was put into Henschel mixer and then coated with the above solution.

The coated polyethylene pellet was reactive-extruded with 60 wt. % of oxydized starch based on the above linear low density polyethylene in an extruder maintained at 170° C. with a screw speed of 230 rpm to prepare biodegradable master batch pellet. 1.7 kg of biodegradable master batch pellet and 8.3 kg of linear low density polyethylene(MI=1, density=0.919) were dry-blended to prepare blown films by passing them through a film extruding machine.

The physical properties and biodegradability of the biodegradable films prepared by dry-blending the above biodegradable master batch and linear low density polyethylene(MI=1, density=0.919) were reported in the following table 2.

EXAMPLE 8–12

The same procedure as example 7 was repeated except that the following wt % of starch was used based on polyethylene and the results determined with same method as example 7 were reported in the following table 2.

TABLE 2

| Ex. No. | Content of Starch (wt. %) | Tensile Strength (kg/cm$^2$) | Tensile Elongation (%) | Biodegradability |
|---|---|---|---|---|
| Com. 2* | 0 | 330 | 600 | 0 |
| 7 | 10 | 298 | 530 | 3 |
| 8 | 20 | 254 | 495 | 4 |
| 9 | 30 | 194 | 435 | 4 |
| 10 | 40 | 126 | 258 | 4 |
| 11 | 50 | 95 | 120 | 4 |
| 12 | 60 | 75 | 75 | 4 |

*Comparative Example 2: It was estimated with the same procedure as example 7 except that starch was not incorporated.

EXAMPLE 13

The biodegradable films were prepared in this example by bonding polyethylene chains and starch chemically using methacrylic acid as a coupling agent.

100 g of methacrylic anhydride, 5 g of linoleic acid, 20 g of manganese oleate, 20 g of ferrous stearate, 50 g of oleamide, and 5 g of benzoyl peroxide were dissolved in 50 ml of acetone, respectively. 5 kg of high density polyethylene(MI=0.28, density=0.945) was put into Henschel mixer and then coated with the above solution.

The coated polyethylene pellet was reactive-extruded with 60 wt. % of corn starch based oil tile above high density polyethylene in an extruder maintained at 170° C. with a screw speed of 210 rpm to prepare biodegradable master batch pellet.

1.7 kg of biodegradable master batch and 8.3 kg of high density polyethylene(MI=0.28, density=0.945) are dry-blended to prepare biodegradable blown films by passing them through a film extruding machine.

The physical properties and biodegradability of tile biodegradable films prepared by dry-blending the above biodegradable master batch and high density polyethylene(MI= 0.28, density=0.945) were reported in the following table 3.

EXAMPLE 14–b 18 the same procedure as example 13 was repeated except that the following wt. % of starch was used based on polyethylene and the results determined with the same method as example 13 were reported in the following table 3.

TABLE 3

| Ex. No. | Content of Starch (wt. %) | Tensile Strength (kg/cm$^2$) | Tensile Elongation (%) | Biodegradability |
|---|---|---|---|---|
| Com. 3* | 0 | 640 | 600 | 0 |
| 13 | 10 | 585 | 540 | 3 |
| 14 | 20 | 547 | 505 | 4 |
| 15 | 30 | 325 | 425 | 4 |
| 16 | 40 | 216 | 237 | 4 |
| 17 | 50 | 134 | 115 | 4 |
| 18 | 60 | 90 | 68 | 4 |

*Comparative Example 3: It was estimated with the same procedure as example 13 except that starch was not incorporated.

There was no difference in physical properties of the prepared biodegradable films comprising 10 wt. % of starch in comparison with the base resin by Instron measurement. The present process for preparing biodegradable films is found to be an excellent way to minimize lowering of physical properties according to incorporating of starch, which is improved by that biodegradable chemical bonding makes the boundary between matrix resin and starch particle unclear and the phenomenon that the starch particle is cross-sectionally cut is shown on observation of cross-section of films with scanning electron microscope. The biodegradability was the most excellent with more than 10 wt. % of starch.

What we claim is:

1. A biodegradable polyethylene composition chemically bonded with starch comprising 100 parts by weight of polyethylene, 5–400 parts by weight of biodegradable incorporating material selected from the group consisting of corn starch, acid treated starch, esterified starch, etherified starch, cationic starch and mixtures thereof, 0.01–10 pans by weight of coupling agent selected from the group consisting of maleic anhydride, methacrylic anhydride and maleimide, 0.01–10 parts by weight of radical initiator, 0.01–5 parts by weight of Lewis acid catalyst, 0.01–10 parts by weight of autoxidizing agent and 0.01–10 pans by weight of plasticizer.

2. The composition in accordance with claim 1 wherein further comprising 0.01–10 parts by weight of a comonomer.

3. The composition in accordance with claim 2 wherein the comonomer is one or more selected from the group consisting of acrylonitrile, styrene and ethyl acrylate.

4. The composition in accordance with claim 1 wherein the polyethylene is selected from the group consisting of low density polyethylene, linear low density polyethylene or high density polyethylene.

5. The composition in accordance with claim 1 wherein the radical initiator is benzoyl peroxide, di-tert-butyl peroxide, azobisisobutyronitrile, tert-butyl hydroperoxide, dicumyl peroxide, 2,5-dimethyl-2,5-di(t-butylperoxy) hexane or 1,3-bis-(t-butylperoxyisopropyl benzene).

6. The composition in accordance with claim 1 wherein the autoxidizing agent is one or more selected from the group consisting of manganese oleate, manganese stearate, ferrous oleate(II), ferrous stearate(II) and mixtures thereof.

7. The composition in accordance with claim 1 wherein the plasticizer is one selected from group consisting of oleamide, poly(hexafluoropropylene)-copoly(vinylidene fluoride and cis-13-docosenoamide.

8. The composition in accordance with claim 1 wherein the Lewis acid catalyst is one or more selected from the group consisting of oleic acid, olenic acid, linoleic acid, stearic acid, acetic acid, p-toluene sulfonic acid, decanoic acid, dodecanoic acid, tetradecanoic acid, oxalic acid, malonic acid, succinic acid and adipic acid.

9. A biodegradable polyethylene article chemically bonded with starch comprising mixing a polyethylene composition in accordance with claim 1, reactive-extruding the mixture and pelleting into master batch pellet.

10. A biodegradable polyethylene article in accordance with claim 9 which further comprises adding a polyethylene selected from the group consisting of low density polyethylene, linear low density polyethylene or high density polyethylene into the master batch pellet, dry-blending and extruding the above.

11. A biodegradable polyethylene article in accordance with claim 10 wherein the biodegradable polyethylene article is a film or a bottle.

12. A process for preparing a biodegradable polyethylene composition chemically bonded with starch, comprising mixing 100 parts by weight of polyethylene, 6–400 parts by weight of biodegradable incorporating material selected from the group consisting of corn starch, acid treated starch, esterified starch, etherified starch, cationic starch and mixtures thereof, 0.01–10 parts by weight of coupling agent selected from the group consisting of maleic anhydride, methacrylic anhydride, and maleimide, 0.01–1.0 parts by weight of radical initiator, 0.01–6 parts by weight of Lewis acid catalyst, 0.01–10 parts by weight of autoxidizing agent and 0.01–10 parts by weight of plasticizer and reactive-extruding said mixture.

13. The process in accordance with claim 12 including further mixing one or more comonomers selected from the group consisting of acrylonitrile, styrene and ethyl acrylate in an amount of 0.01–10 parts by weight.

14. The process in accordance with claim 12 wherein further comprising drying the biodegradable incorporating material to a moisture content in the range of less than 3% before reactive-extruding the mixture.

15. The process in accordance with claim 12 wherein said mixture is reactive-extruded at a temperature of 150°–220° C. with a screw speed of 50–300 rpm.

\* \* \* \* \*